(12) United States Patent
Harnish et al.

(10) Patent No.: US 6,848,566 B2
(45) Date of Patent: Feb. 1, 2005

(54) CONTINUOUSLY ADJUSTABLE APPARATUS FOR REPOSITIONING DISCRETE ARTICLES

(75) Inventors: David Alan Harnish, Maysville, KY (US); Amy Christine Charlton, Cincinnati, OH (US); David William Slack, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 64 days.

(21) Appl. No.: 10/610,076

(22) Filed: Jun. 30, 2003

(65) Prior Publication Data

US 2004/0262127 A1 Dec. 30, 2004

(51) Int. Cl.[7] .............................................. B65G 47/28
(52) U.S. Cl. ............................... 198/459.8; 198/461.1; 198/474.1
(58) Field of Search ........................ 198/459.8, 461.1, 198/461.2, 474.1, 476.1, 477.1, 468.6, 468.01, 374, 377.07, 377.08, 619

(56) References Cited

U.S. PATENT DOCUMENTS

| | | | |
|---|---|---|---|
| 3,251,452 A | 5/1966 | Conway et al. | |
| 3,386,558 A | 6/1968 | Benatar et al. | |
| 3,485,339 A | 12/1969 | Miller et al. | |
| 3,827,545 A | 8/1974 | Buhayar | |
| 3,834,522 A | 9/1974 | Jackson | |
| 3,847,273 A | 11/1974 | Buhayar | |
| 4,176,741 A | 12/1979 | Vogel | |
| 4,227,606 A | 10/1980 | Bogatzki | |
| 4,267,917 A | 5/1981 | Vogel | |
| 4,394,898 A | 7/1983 | Campbell | |
| 4,506,779 A | 3/1985 | Seragnoli | |
| 4,578,133 A | 3/1986 | Oshefsky et al. | |
| 4,586,598 A | 5/1986 | Ehlscheid et al. | |
| 4,726,876 A | 2/1988 | Tomsovic, Jr. | |
| 4,817,694 A * | 4/1989 | Matsuo et al. | 198/346.2 |
| 4,921,387 A * | 5/1990 | Bennington | 414/779 |
| 5,006,028 A * | 4/1991 | Jackson | 414/222.04 |
| 5,091,039 A * | 2/1992 | Ujimoto et al. | 156/519 |
| 5,125,500 A * | 6/1992 | Cailbault | 198/470.1 |
| 5,160,235 A * | 11/1992 | Bikow | 414/416.05 |
| 5,172,803 A * | 12/1992 | Lewin | 198/619 |
| 5,244,078 A * | 9/1993 | Silva et al. | 198/464.3 |
| 5,248,236 A * | 9/1993 | Ooshima et al. | 414/676 |
| 5,271,489 A | 12/1993 | Helmstetter | |
| 5,311,976 A * | 5/1994 | Backman | 198/349.1 |
| 5,413,203 A * | 5/1995 | Sonderegger | 198/345.1 |
| 5,417,037 A * | 5/1995 | Osti et al. | 53/446 |
| 5,452,981 A * | 9/1995 | Crorey et al. | 198/468.6 |
| 5,639,206 A * | 6/1997 | Oda et al. | 414/749.2 |
| 5,703,332 A * | 12/1997 | Tas | 177/52 |
| 5,988,354 A * | 11/1999 | Spatafora et al. | 198/471.1 |
| 6,098,785 A * | 8/2000 | Van Maanen | 198/459.8 |
| 6,220,424 B1 * | 4/2001 | Fluck | 198/468.6 |
| 6,230,779 B1 * | 5/2001 | Anderson et al. | 156/567 |
| 6,234,300 B1 * | 5/2001 | De Vos et al. | 198/459.8 |
| 6,319,347 B1 * | 11/2001 | Rajala et al. | 156/164 |
| 6,374,995 B1 * | 4/2002 | Hofele et al. | 198/750.12 |
| 6,591,756 B2 * | 7/2003 | Mayer et al. | 104/290 |
| 6,604,623 B2 * | 8/2003 | Sumi et al. | 198/377.08 |
| 6,620,276 B1 * | 9/2003 | Kuntze et al. | 156/164 |
| 6,705,453 B2 * | 3/2004 | Blumenthal et al. | 198/471.1 |
| 6,719,031 B2 * | 4/2004 | Sawai | 156/519 |
| 6,722,494 B2 * | 4/2004 | Nakakado | 198/792 |
| 6,748,996 B2 * | 6/2004 | Nakakado et al. | 156/556 |

* cited by examiner

*Primary Examiner*—Eileen D. Lillis
*Assistant Examiner*—Rashmi Sharma
(74) *Attorney, Agent, or Firm*—Peter D. Meyer

(57) ABSTRACT

An apparatus for changing the spacing between discrete articles having at least one linear motor disposed radially from a central axis, and a pick-up disposed proximate to the linear motor. The at least one linear motor is capable of adjusting the radial position of the pick-up with respect to the central axis so that an article is transferable from a first surface to the pick-up, the at least one linear motor adjusts the pick-up radially from the central axis, and the article is transferable from the pick-up to a second surface.

20 Claims, 7 Drawing Sheets

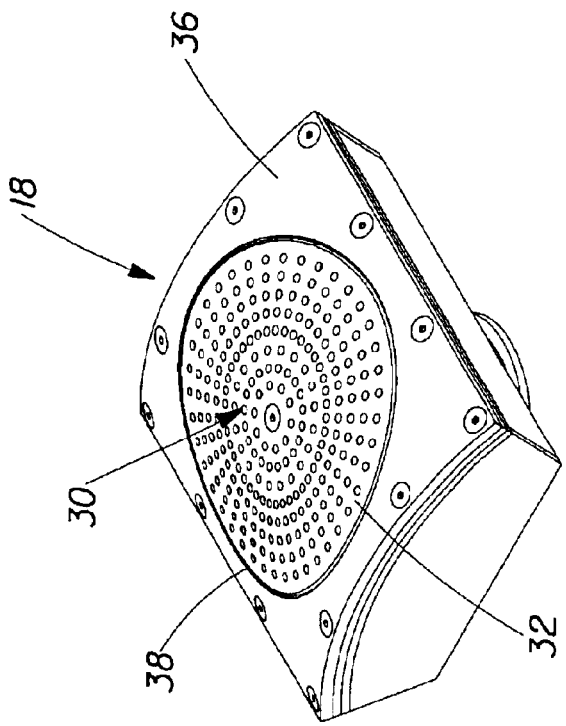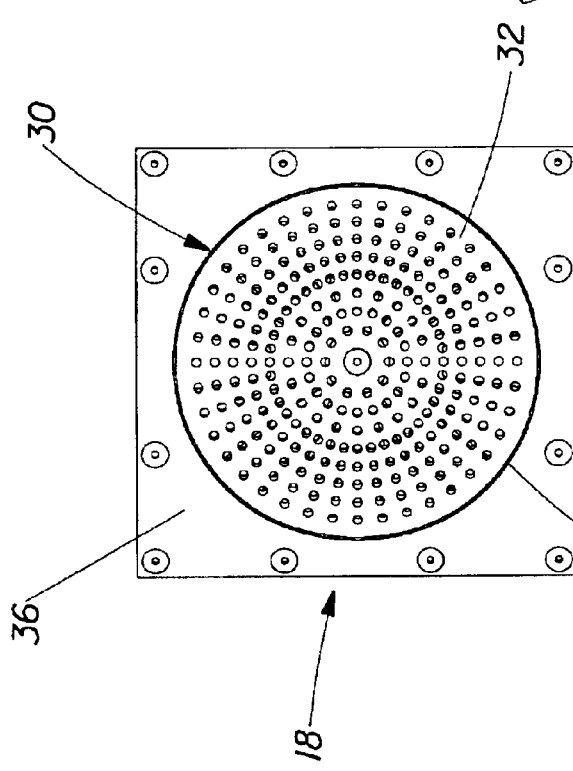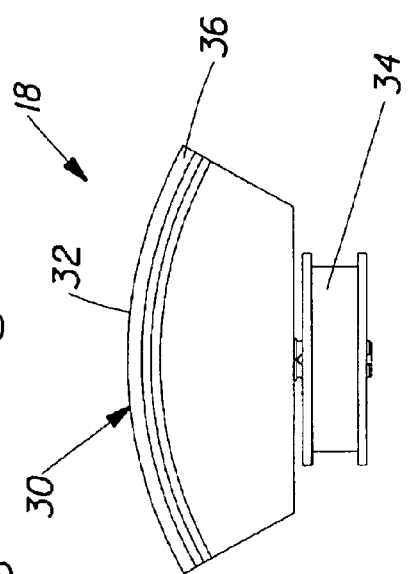

CONTINUOUSLY ADJUSTABLE APPARATUS FOR REPOSITIONING DISCRETE ARTICLES

FIELD OF INVENTION

The present invention is an apparatus and method for repositioning discrete articles from a continuously moving conveyor.

BACKGROUND OF THE INVENTION

Devices used for altering the spacing of articles in a conveying system are well known in the art. The repositioning of discrete articles in a conveying system can be utilized in the manufacture of disposable diapers, feminine hygiene products, incontinence control garments, and the like. In such a system, discrete abutting segments of an absorbent material cut from a continuously moving web of material can be repositioned to form a spaced apart array upon a continuously moving web of substrate material.

Articles, such as disposable diapers, are generally made with a liquid-impervious backing sheet upon which absorbent pads are positioned and covered by a liquid-pervious top sheet. The resulting composite material is then generally formed into a discrete article. In many cases, it may be desirable to place discrete absorbent pads in spaced apart locations on the liquid-impervious back sheet (or onto a liquid-pervious front sheet) that can serve as the substrate upon which the absorbent pads are placed. The discrete absorbent pads are usually cut from a continuously moving web of absorbent material or material formed in place, yielding pads in an abutting relationship on a conveyor system. Consequently, an apparatus and process for placing the discrete absorbent pads onto the substrate web with a selected spacing between adjacent webs can become necessary. Conversely, it may also be desired to place individual articles of an array of spaced apart articles into a continuous abutting array. In any regard, the spacing between adjacent articles on a moving conveyor system may be required to change from one distance to another.

However, current systems generally utilize a cam track in order to move a carriage having a plurality of suction cups mounted thereto. The cam track moves the carriage radially outward during rotation to enable a suction cup to grip an object at an unloading station. The object is then moved outwardly toward the output device. In order to change the spacing of the placed articles, a new cam track having the new path directions must be installed. Such devices are shown in Jackson, U.S. Pat. No. 3,834,522.

Other methods utilized for changing the spacing between a plurality of articles include the use of paired rolls operating at different peripheral speeds in order to separate individual articles passing therethrough. Such a system is disclosed in Banks, U.S. Pat. No. 3,494,001, and Buhayar, U.S. Pat. No. 3,827,545.

Other methods of adjusting the spacing of articles comprise a rotating element having a plurality of equally spaced cranks, each crank being provided with a suction housing for holding and releasing an article. Each crank is connected to the rotating device by a link that causes the crank to oscillate at a rate that matches the velocity of the inlet conveyor as the conveyor rotates. Such an apparatus is discussed in Seragnoli, U.S. Pat. No. 4,506,779. Yet still another method of altering the spacing in a plurality of conveyed articles incorporates the use of a rotating drum having fixed and radially extending arms. The radially extended arms can engage a dispensed object, such as a diaper, as the arm rotates about its own axis. Such an apparatus is disclosed in Campbell, U.S. Pat. No. 4,394,898.

Accordingly, it would be desirable to provide a device that is capable of adjusting the spacing between articles of a moving array of discrete articles. Further, it would be desirable to provide an apparatus that is continually adjustable and capable of higher production speeds without the need to stop production in order to provide changes to the space changing system.

SUMMARY OF THE INVENTION

In a non-limiting exemplary embodiment of the present invention, an apparatus for changing the spacing between discrete articles comprises at least one linear motor disposed radially from, and capable of rotation about, a central axis, and a pick-up operably connected to the linear motor. The at least one linear motor is capable of adjusting the radial position of the pick-up with respect to the central axis and is capable of receiving an article from a first surface. The linear motor adjusts the position of the pick-up radially from the central axis. The article is transferable from the pick-up to a second surface having a different radial position from the first surface.

In an alternative embodiment, an apparatus for changing the spacing between discrete articles comprises a plurality of linear motors orbitally disposed about a central axis. Each of the plurality of linear motors has a first pick-up operatively associated therewith. Each of the plurality of linear motors is capable of adjusting the radial distance of the pickup operatively associated therewith from the central axis. The first pick-up contacts an article and the linear motor adjusts the radial distance of the first pickup from the central axis.

In yet another embodiment of the present invention, a method for changing the spacing between discrete articles comprises the steps of: (a) providing a plurality of articles on a first surface; (b) contacting each of the articles with a pick-up, the pick-up being operably connected to a linear motor, the linear motor being disposed radially about a central axis; (c) adjusting the radial position of said pick-up with the linear motor with respect to said central axis; and, (d) transferring the article from the pick-up to a second surface.

BRIEF DESCRIPTION OF THE DRAWINGS

FIG. 5 is an expanded view of the region labeled 5 on FIG. 2;

FIG. 6 is a cross-sectional view taken along the line 6—6 of FIG. 2;

FIG. 7 is a perspective view of the pick-up of FIG. 6;

DETAILED DESCRIPTION OF THE INVENTION

The present invention is related to a continuously adjustable repositioning apparatus for repositioning an article. The continuously adjustable repositioning apparatus can provide the ability to reposition a series of articles. For example, if a series of articles are provided on a surface at a first spacing, the articles can be repositioned by the continuously adjustable repositioning apparatus onto a second surface at a second spacing. The purpose of repositioning such articles can include, but not be limited to, the placement of absorbent articles from a conveyor system supplying such absorbent articles onto a web substrate such as could be used in a diaper manufacturing process or an adult incontinence article manufacturing system. Additionally, the present invention could be utilized to compress or stretch a web of material to form a web having rugosities or provide a web of material with a desired stretch or compression characteristic.

Figure 1:
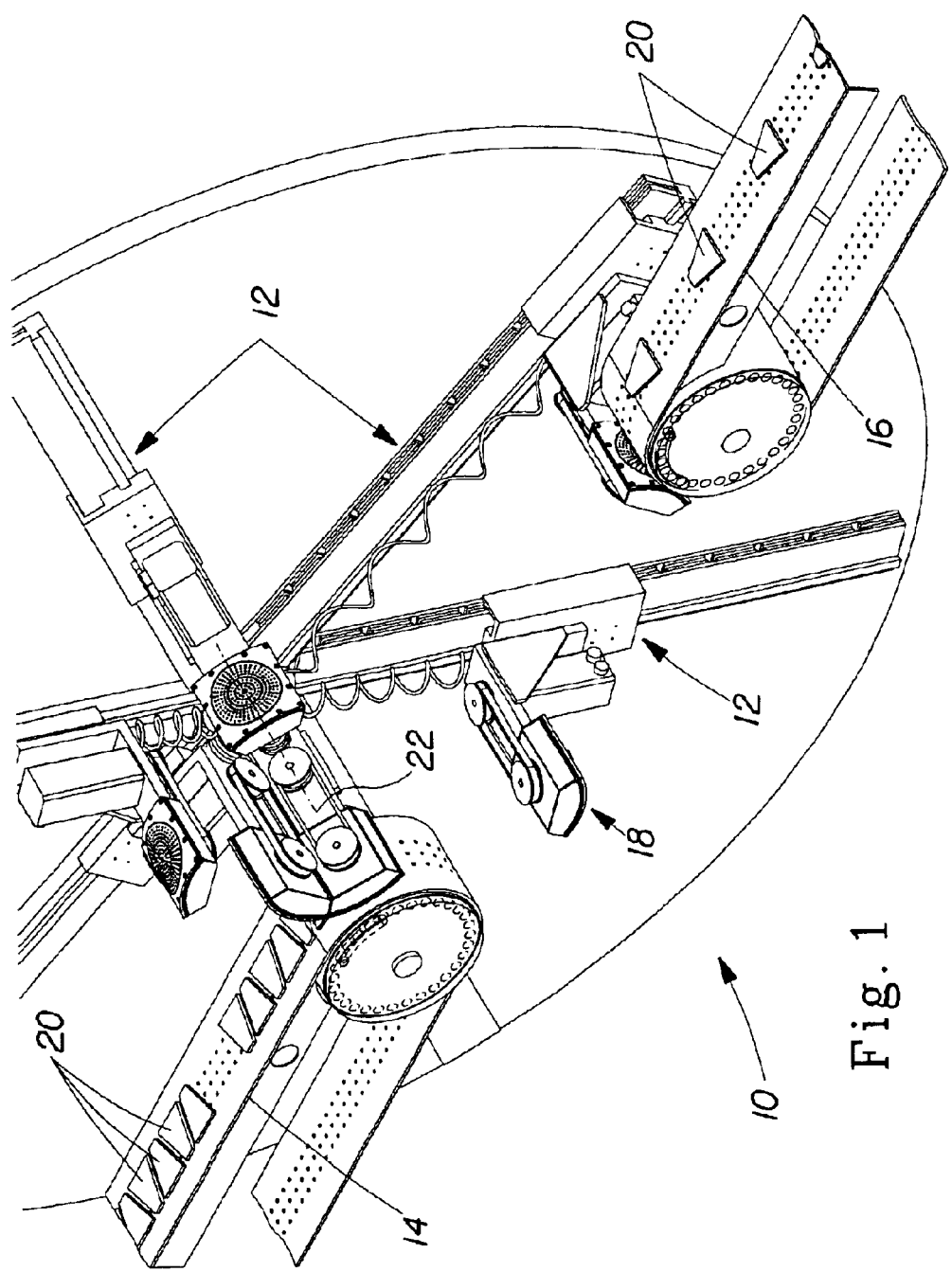
FIG. 1 is a perspective view of space changing apparatus of the present invention.

Referring to FIG. 1, a continuously adjustable repositioning apparatus 10 comprises at least one linear motor 12 disposed radially from a central axis 22 and connected to a central hub (not shown), and a pick-up 18 operatively associated with and radially moveable by linear motor 12. The linear motor is capable of adjusting the radial position of the pick-up 18 from the central axis 22 of the continuously adjustable repositioning apparatus 10. Additionally, pick-up 18 is capable of attachment to an article 20 from a first surface 14, such as a conveyor, and depositing the article 20 upon a second surface 16, such as a conveyor. Pick-up 18 can be adjusted radially from the central axis 22 of the continuously adjustable repositioning apparatus 10 and can simultaneously, or sequentially, orbit about central axis 22 of the continuously adjustable repositioning apparatus 10.

Thus, in a preferred embodiment, as article 20 progresses along first surface 14 toward the repositioning apparatus 10, the pick-up 18 can assume a first position to complement the arrival of article 20 at the interface of pick-up 18 and first surface 14. Upon transfer of article 20 to pick-up 18, repositioning apparatus 10 can adjust the position of pick-up 18 with respect to the central axis 22 by the adjustment, or movement, of linear motor 12, thereby adjusting the position of article 20 with respect to the central axis 22. Article 20 can be releasably attached to first surface 14 by any method known to one of skill in the art. Exemplary, but non-limiting attachment can include the use of vacuum, cohesive forces, adhesives, hooks and loops, and the like.

In a preferred embodiment, pick-up 18 can also rotate about an axis extending radially from central axis 22 concurrently with a radial displacement of pick-up 18 from central axis 22 by linear motor 12. Pick-up 18 can then progress away from the central axis 22 to a position so that pick-up 18, with article 20 disposed thereon, becomes tangent to second surface 16. The article 20 can then be transferred from the pick-up 18 to second surface 16, thereby acquiring a different spacing upon second surface 16 from the spacing of article 20 disposed on first surface 14. One of skill in the art should recognize that that article 20 can also be directly placed on pick-up 18 or be disposed from pick-up 18 to a surface other than second surface 16. By way of example, article 20 can be manually placed on pick-up 18 and then deposited into an appropriate receptacle.

The linear motor 12 can be either an AC or DC type and generally comprises a stationary base, a moving table, linear bearings, and a linear motor. As would be known to one of skill in the art, a linear motor produces a linear force rather than torque that is produced in a rotary motor. It should also be known that linear motors could utilize control systems used for rotary motors. By way of example, a linear encoder can provide linear motor 12 positioning. Exemplary, but non-limiting linear motors include linear brushless motors, linear stepping motors, linear induction motors, linear servo motors, AC induction motors, DC brushed motors, iron core brushless motors, cog-free brushless motors, ironless core brushless motors, and combinations thereof Brushless motors can provide non-contact operation with non-wearing parts and provide higher forces in a small package. An AC induction linear motor can be used for heavy loads utilizing an open loop system. A vector control can be utilized for closed position loop operation.

Additionally, AC linear induction can also be used with a vector control in order to control motor position, or an inverter to control motor velocity. Without desiring to be bound by theory, it is believed that closed loop servo systems require a positioning feedback device, usually a non-contact device, such as a glass scale or magnetic linear encoder. Such an encoder can allow precise control of the motor stage position, velocity, and acceleration. In this way, motion can be achieved in a linear motor by connecting the motor to an appropriate amplifier. In a closed loop system, the position loop is closed with a motion controller. A preferred linear motor would provide high acceleration in the order of 10 g's (98 m/s$^2$), at speeds of at least about 200 in/sec (5 m/s) having a payload of up to 50 lbs. (23 kg.). It would also be known to one of skill in the art that a linear motor could have a stroke length of up to 144 inches (3.65 m). An exemplary linear motor is Model LSS1TECF06E30, available from The Baldor Motor & Drive Company. It would be further known to one of skill in the art that air cylinders, hydraulic cylinders, open loop chain systems, closed loop chain systems, and other linear positioning devices having a position feedback could be utilized with a controller to provide the linear motion described herein.

A linear motor 12 driven positioning stage is generally built on a stationary base that provides a stable, precise, and flat platform. Typically, the linear motor 12 base is made from a lightweight material, including, but not limited to, aluminum, steel, ceramic, or granite plate. Generally, all stationary parts of any positioning components would be attached to the base of linear motor 12.

The moving parts of the various positioning components of linear motor 12 are generally attached to the moving table of the linear motor 12. As with the stationary base, the moving table of linear motor 12 is generally made from a lightweight material, such as aluminum, in order to provide for maximum acceleration. Mounting one or more linear bearing rails to the base plate of the linear motor 12 can provide precise lateral and vertical guidance of the moving tables of a linear motor 12. Further, the linear bearing rails of linear motor 12 can be mounted with one or more linear recirculating ball bearings or air bearings on each rail.

Still referring to FIG. 1, operationally, a pick-up 18 of space changing apparatus 10 generally orbits about central axis 22. When a pick-up 18 orbits about the central axis 22 of space changing apparatus 10, pick-up 18, generates an orbital velocity about central axis 22. Thus, in a preferred embodiment, pick-up 18 has an orbital velocity that is at least about equal to the velocity of an article 20 disposed upon a moveable first surface 14 so that article 20 can be efficaciously transferred from the first surface 14 without the need to stop, increase, or reduce the orbital velocity of pick-up 18 about central axis 22.

In a preferred embodiment, it was found to be beneficial for pick-up 18 to orbit about central axis 22 so that pick-up 18 has the same velocity (an efficacious velocity) as an article 20 disposed upon first surface 14 at the time of transfer of article 20 from first surface 20 to pick-up 18. As would be known to one of skill in the art, an efficacious orbital velocity for pick-up 18 about central axis 22 for the efficacious transfer of article 20 from a first surface 14 to pick-up 18 can be calculated by first measuring the radius of the orbit transcended by pick-up 18 about the central axis 22 and the orbital number, in revolutions per minute (RPM), of pick-up 18 as pick-up 18 revolves around the central axis 22. From these measurements, the efficacious orbital velocity of the pick-up 18 can then be readily calculated for a given radius of displacement of pick-up 18 from central axis 22. Thus, when a manufacturing process requires articles 18 that are provided on a slow moving first surface 14 to be placed on a faster moving second surface 16, a calculation can be made that keeps the orbital number constant, in order to provide the desired article 20 pitch upon second surface 16. The efficacious transfer orbital velocity can then be provided by the ratio of the radius of the orbit transcended by pick-up 18 with respect to first surface 14 and the radius of the orbit transcended by pick-up 18 with respect to second surface 16 for any given application speed.

Figure 2:
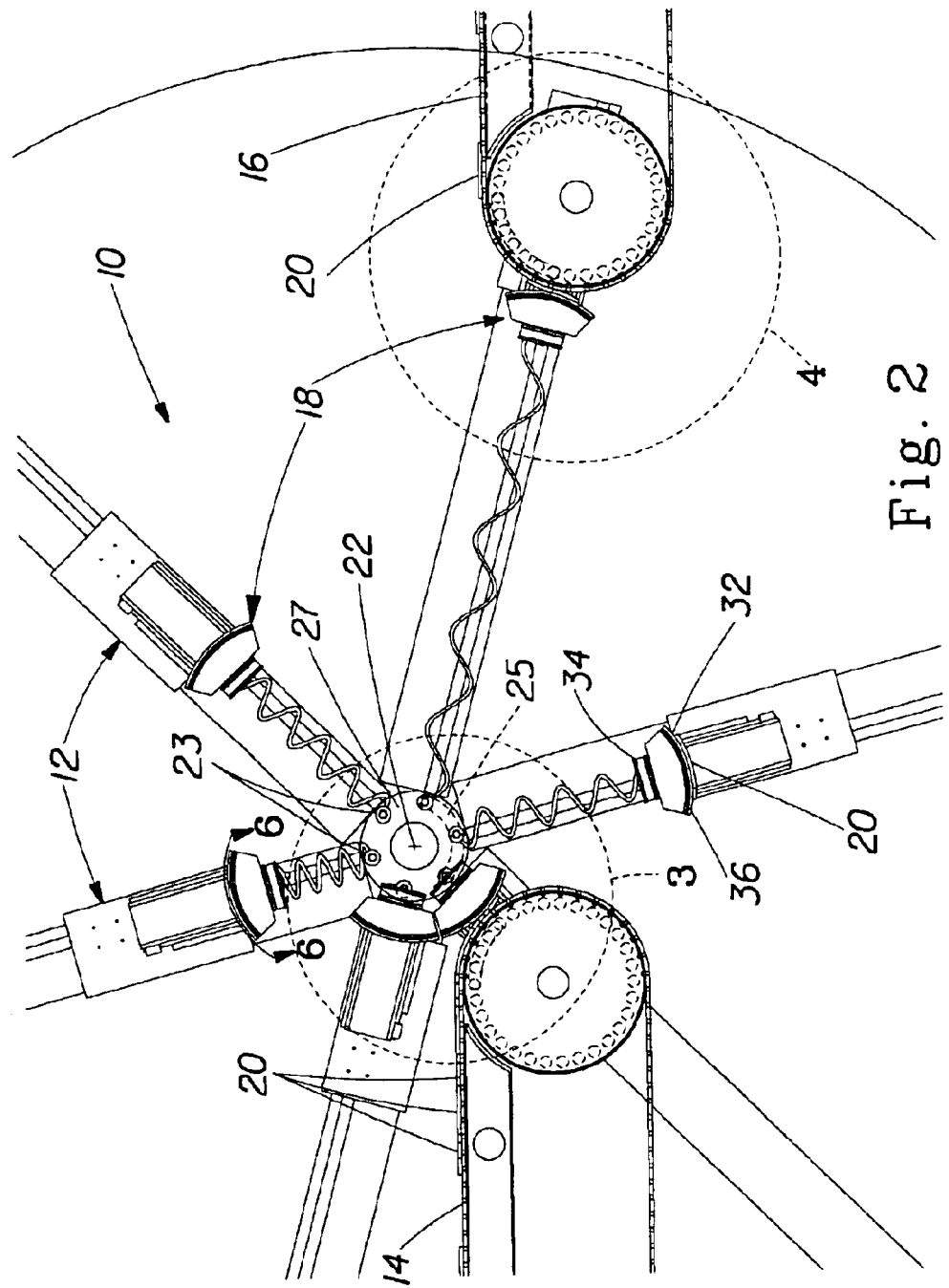
FIG. 2 is a partial front elevational view of FIG. 1.

As shown in FIG. 2, pick-up 18 can generally utilize vacuum forces for the efficacious transfer of article 20 from first surface 14 to pick-up 18 or the efficacious transfer of article 20 from pick-up 18 to second surface 16. In a preferred embodiment, a central vacuum system comprising a Rotron®-type blower was found to be practical and efficient. However, one of skill in the art would realize that virtually any enclosed fan or blower could be used as a source of vacuum. In this regard, a vacuum, or negative pressure, can be directed toward pick-up 18 with mechanical piping connected to the inlet or suction side of the blower.

Figure 3:
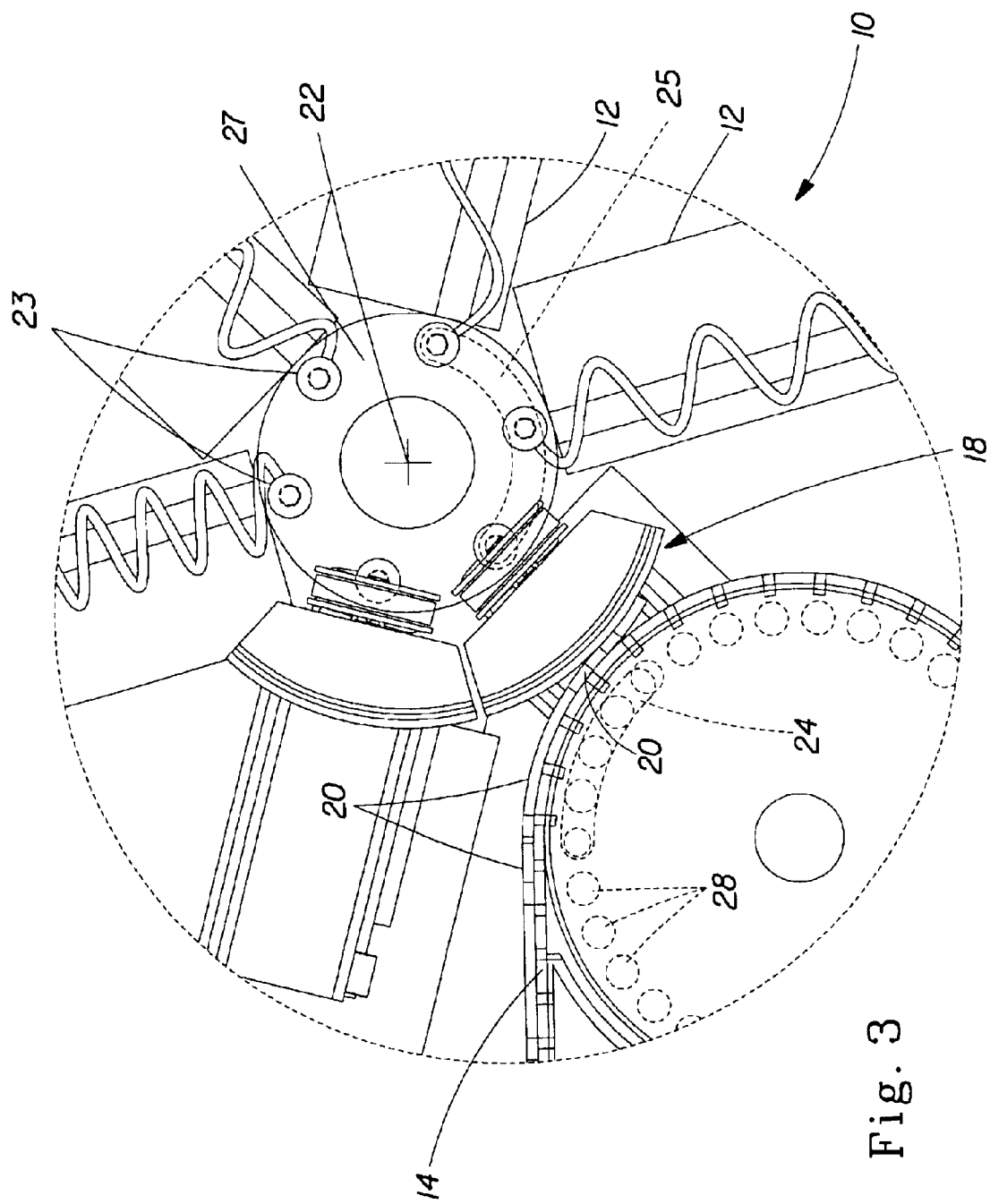
FIG. 3 is an expanded view of the region labeled 3 on FIG. 2.

Referring to FIG. 3, a vacuum can be applied to a surface through plumbing that connects to transfer drums or head pulleys disposed in first surface 14 that have multiple mechanical vacuum passages 28. These mechanical vacuum passages 28 move radially past a vacuum supply slot 24 (manifold), known to those of skill in the art as a "banana slot" due to the curved orientation of the vacuum supply slot 24. When the mechanical vacuum passages 28 are adjacent to the vacuum supply slot 24, vacuum can then be communicated from the vacuum supply slot 24, through the mechanical vacuum passage 28 to the article 20. As a mechanical vacuum passage 28 progresses past the vacuum supply slot 24, vacuum communication is disrupted and the article 20 is then preferably simultaneously released from first surface 14 to pick-up 18 as vacuum communication ports 23 located in central hub 27 and connected to pick-up 18 traverse toward a central hub vacuum supply slot 25 located in central hub 27, communicate vacuum to article 20. Further, the radial position or "phasing" of the vacuum supply slot 24 and central hub vacuum supply slot 25 can be adjustable. This can be desirable in order to adequately time any dynamic demands of the system. It should be realized that one of skill in the art would be able to efficaciously detach article 20 from first surface 14 and efficaciously attach article 20 to pick-up 18 in any manner of timing, or order.

Figure 4:
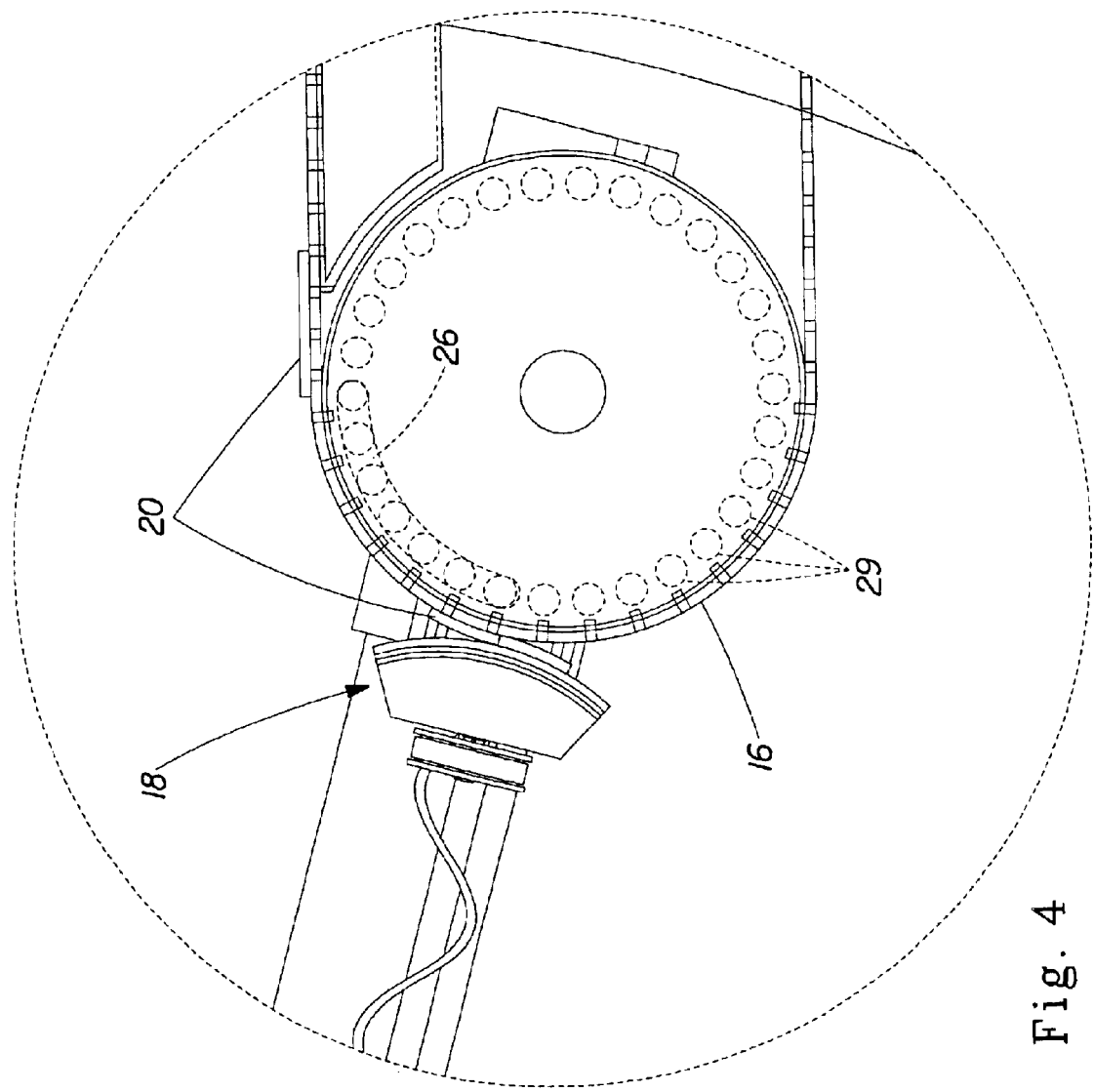
FIG. 4 is an expanded view of the region labeled 4 on FIG. 2.

As shown in FIG. 4, and as discussed supra, after an article 20 is removeably attached to pick-up 18 of space changing apparatus 10 from first surface 14, the pick-up 18 is then preferably orbited about central axis 22. Linear motor 12 can then, either simultaneously with an orbit of pick-up 18 about central axis 22, or independent of any orbit of pick-up 18 about the central axis 22, adjust the position of pick-up 18 radially from central axis 22. As the pick-up 18 becomes proximate and/or tangent to second surface 16, a vacuum applied from second supply slot 26 disposed upon second surface 16 can then apply a vacuum through the second mechanical vacuum passage 29 to the surface of article 20 disposed upon pick-up 18. In other words, a corresponding concurrent or independent release of vacuum to the surface of article 20 from central hub vacuum supply slot 25 through vacuum communication ports 23 of pick-up 18 as a portion of vacuum applied from second supply slot 26 to article 20 through second mechanical vacuum passage 29 causes article 20 to releaseably attach to the second surface 16 as article 20 becomes proximate to second surface 16. In this manner, it is believed that article 20 can then be efficaciously removed from pick-up 18 and deposited onto second surface 16.

Conversely, the process described supra, and shown in FIGS. 3 and 4, could be operated in reverse for the efficacious transfer of an article 20 vacuumably attached to second surface 16 to pick-up 18. Following the attachment of article 20 to pick-up 18, pick-up 18 can then be repositioned proximate to first surface 14 for deposition of article 20 thereon, thereby facilitating the positioning of article 20 in a closer-spaced positioning from a wider-spaced positioning. Without desiring to be bound by theory, it follows that the use of such a space changing apparatus 10, as described herein, is more efficacious than a conventional cam track and cam follower system by providing for a reversible article 20 placement process. This is believed to be because the pressure angle, generated by a conventional cam track and cam follower system, can be too great to allow a conventional cam track and cam follower system to run in reverse.

Even though it is believed that a vacuum-transfer system as discussed can provide the most efficacious manner in which to transfer an article 20 about the space changing apparatus 10, one of skill in the art would be able to utilize any system that can provide efficacious movement of article 20 about space changing apparatus 10. Other transfer methods, as with the methods of attachment of article 20 surface 14 discussed supra, could comprise the use of high and/or low tack adhesive systems, a physical system (i.e., hooks and loops), a magnetic system, an electric system, combinations thereof, and the like to provide for the transfer of article 20 from first surface 14 to pick-up 18 or from pick-up 18 to second surface 16.

As discussed supra, it is preferred that pick-up 18 orbit about central axis 22 to produce an orbital velocity that is equal to the velocity of the article 20 on first surface 14 when pick-up 18 is proximate to first surface 14. Further, it is preferred that the orbital velocity of the pick-up 18 be equal to the velocity of second surface 16 when pick-up 18 is proximate to second surface 16 at the time of deposition of article 20 upon second surface 16 after any radial adjustment of pick-up 18 from the central axis 22 by linear motor 12. In a preferred embodiment, it is preferred that the orbital velocity of the central axis 22 be constant, thereby eliminating the need for pick-up 18 to stop or slow as pick-up 18 orbits about central axis 22. In other words, while the orbital velocity of pick-up 18 will change as pick-up 18 is radially adjusted, and orbits about, central axis 22, the average orbital velocity of pick-up 18 about central axis 22 preferably remains constant. But, in any regard, it is preferable that pick-up 18 be capable of radial adjustment from the central axis 22 by linear motor 12 simultaneous with pick-up 18 orbiting about the central axis 22.

In a preferred embodiment, pick-up 18 can further provide an axis about which a releaseably attached article 20 can be rotated. In this way, an article 20 releasably attached to pick-up 18 can be rotated during, or after attachment of article 20 to pick-up 18. Providing rotation in this manner can allow the placement of an article 20, having a major axis with an orientation with respect to the machine direction, upon second surface 16 at an orientation that skews the major axis of article 20 relative to the machine direction. As shown in FIG. 1, as articles 20 are provided to pick-up 18 in a co-extensive 180-degree relationship with respect to the major axis of each other and a 90-degree relationship with respect to the machine direction of first surface 14, pick-up 20 can rotate each article 20 so that the major axis of each article 20 is presented in a uniform angular relationship with respect to the machine direction of the end process as required. In other words, as article 20 is attached to pick-up 18, article 20 can be concurrently revolved around an axis perpendicular to the axis of rotation of central axis 22 as pick-up 18 is radially displaced from, and/or orbits about, the central axis 22.

As shown in FIGS. 5–7, pick-up 18 can provide rotation of article 20 by providing a rotational mechanism 30. Rotational mechanism 30 generally comprises a conformable permeable disk 32 attached and disposed proximate to a rotary drive 34. Preferably, the conformable permeable disk 32, having a first side and a second side opposed thereto, is rotatably disposed within the surface 36 of pick-up 18. In a preferred embodiment, conformable permeable disk 32 is placed within a circular relief frame 38 forms the surface contour for conformable permeable disk 32.

Figure 8:
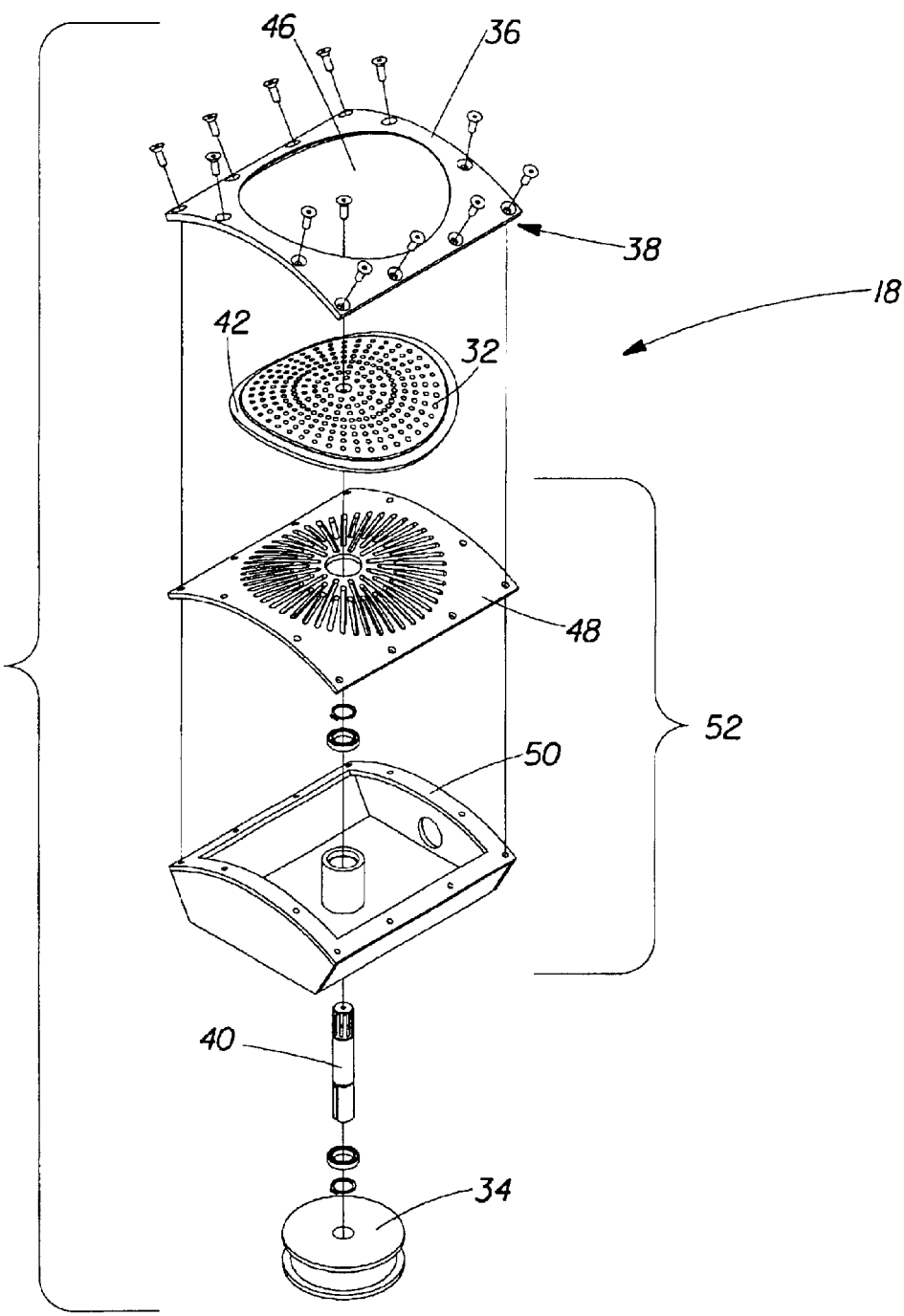
FIG. 8 is an exploded view of FIG. 7.
Figure 9:
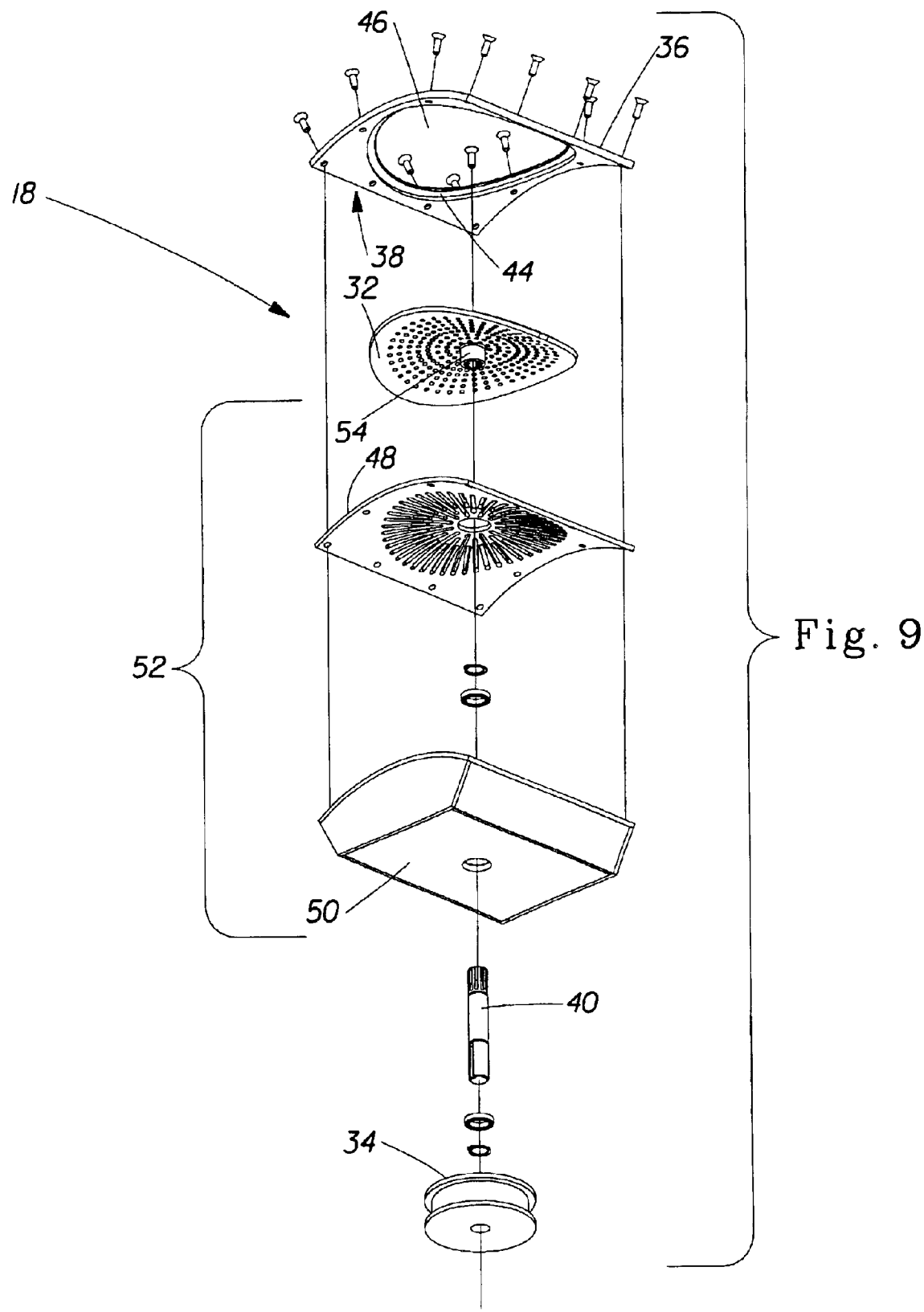
FIG. 9 is a lower perspective exploded view of the pick-up of FIG. 7.

As shown in the exploded views of FIGS. 8 and 9, pick-up 18 provides a rotary drive 34 for indexing an article 20 with respect to pick-up 18. As would be known to one of skill in the art, rotary drive 34 can be provided as a separate stepper motor, servo motor, pulley with an external drive, or the like. In any regard, the rotary drive 34 is preferably attached to conformable permeable disk 32 via a connecting member 40. Connecting member 40 is preferably a spline shaft that mateingly engages a receiver 54 fixably attached to the internal surface of conformable permeable disk 32. However, connecting member 40 can be any form of connecting means that would be known to one of skill in the art to connect the output of rotary drive 34 to conformable permeable disk 32.

In a preferred embodiment, conformable permeable disk 32 is provided with a ridge 42 disposed upon the periphery of conformable permeable disk 32. Ridge 42 is preferably shaped to be matingly engageable with a corresponding groove 44 disposed within the inner surface of relief frame 38 to maintain, retain, and/or constrain conformable permeable disk 32 to an efficacious geometry. Ridge 42 and groove 44 are preferably circular in order to facilitate rotational movement of conformable permeable disk 32 about the longitudinal axis of pick-up 18, although one of skill in the art would be able to provide conformable permeable disk 32, ridge 42 and groove 44 with any shape or configuration and still enable rotation of an article 20 disposed upon a surface, or side, of conformable permeable disk 32. Further, conformable permeable disk 32 is preferably produced from virtually any material that exhibits high elasticity, low coefficient of friction, and high yield strength. Teflon®, polypropylene, high-density polyethylene, and/or low-density polyethylene are capable of providing these characteristics.

Relief frame 38 is provided with an orifice that is preferably shaped to provide access for permeable disk 32 to the region external to pick-up 18 in order for an article 20 to be releaseably attached to permeable disk 32. Although a circular orifice 46 provides the most mechanically adaptable region, one of skill in the art would be able to provide orifice 46 with any geometry to provide an efficacious region about the external surface of permeable disk 32.

Conformable permeable disk 32 can be exposed to a vacuum source in order to control the efficacious pick-up or disposal of an article 20 onto an external surface of conformable permeable disk 32 thereof. In this regard, conformable permeable disk 32 can be disposed upon back plate 48. Back plate 48, upon attachment to chamber 50, forms the vacuum plenum 52 for attaching or disposing of an article 20 disposed upon conformable permeable disk 32 of pick-up 18. Back plate 48 can be provided with through-holes, spokes, or the like, that can provide the to vacuum to conformable permeable disk 32. Additionally, back plate 48 can be provided with any geometry, or curvature, suitable for the process required. However, it is preferred that back plate 48 be provided with an arcuate or curvilinear cross-section (i.e., concave or convex) that can provide an efficacious transfer of an article 20 from first surface 14 to conformable permeable disk 32 and from conformable permeable disk 32 to second surface 16. One of skill in the art could provide back plate 48 with a semi-spherical shape so that if pick-up 18 is completely rotated, conformable permeable disk 32 will always have a surface that is tangent to either first surface 14 or second surface 16. In any regard, it is believed that an article 20 will attach to pick-up 18 from first surface 14 on the outward surface of conformable permeable disk 32 as a vacuum is supplied to conformable permeable disk 32 from the vacuum plenum 52 through back plate 48. After such attachment, rotary drive 34 then rotates the conformable permeable disk 32 via shaft 40 to place the article 20 in another configuration for eventual deposition upon second surface 16.

Exemplary Process

The continuously adjustable repositioning apparatus 10 of the present invention can be used efficaciously in various manufacturing processes. Such a process can require the repositioning of several components in order to produce a final product. For example, a process requiring the final product-to-product machine direction length to be the required pitch dimension may require several sub-components having a length less than the required pitch dimension to be accurately repositioned and placed at the final pitch dimension.

In this instance, the linear speed of each sub-component being introduced into the manufacturing process could be different. For example, the absorbent core sub-component of a baby diaper can be centrally located within the webbing (e.g., chassis) that surrounds that core sub-component feature. Therefore, it may be highly desirable to produce the absorbent core sub-component from a continuous, in-line process. Once the core material is produced, a standard rotary knife, known to one of skill in the art, can sever the core material into a continuous stream of discrete core components having an overall length that is less than the length of the diaper chassis.

The continuously adjustable repositioning apparatus of the present invention can then be used to place each core from the produced stream of core material onto a chassis as described supra. Thus, each core is releaseably attached to the pick-up of the continuously adjustable repositioning apparatus at a first radius that is speed-matched to the slower stream of incoming cores. The continuously adjustable repositioning apparatus then repositions the pick-up to the larger required radius through a portion of a complete rotation and thereby increasing the speed and spacing of the core. At the desired location, the core is then deposited onto the chassis and released from the pick-up. The placement of several pick-ups on the continuously adjustable repositioning apparatus can facilitate numerous incoming and outgoing stream rates and dimensions.

All documents cited herein are, in relevant part, incorporated by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for changing the spacing between discrete articles comprising:
    (a) at least one linear motor disposed radially from, and capable of rotatation about, a central axis; and,
    (b) a pick-up operably connected to said linear motor, said at least one linear motor being capable of adjusting the radial position of said pick-up with respect to said central axis;
    said pick-up being capable of receiving an article from a first surface;
    wherein said at least one linear motor adjusts the position of said pick-up radially from said central axis; and,
    wherein said article is transferable from said pick-up to a second surface, said second surface having a different radial position from said first surface.

2. The apparatus of claim 1, wherein said pick-up orbits about said central axis to produce an orbital velocity.

3. The apparatus of claim 2, wherein said first surface is a first conveyor having a first velocity.

4. The apparatus of claim 3, wherein said orbital velocity of said pick-up is equal to said first velocity of said first conveyor when said article is transferred from said first conveyor to said pick-up.

5. The apparatus of claim 4, wherein said second surface is a second conveyor having a second velocity.

6. The apparatus of claim 5, wherein said orbital velocity of said pick-up is equal to said second velocity of said second conveyor when said article is transferred from said pick-up to said second conveyor.

7. The apparatus of claim 2, wherein said pick-up continuously orbits about said central axis of rotation.

8. The apparatus of claim 1, wherein said apparatus comprises a plurality of linear motors disposed radially from said central axis, each of said linear motors being symmetrically spaced about said central axis.

9. The apparatus of claim 1, wherein said pick-up is capable of rotation about an axis extending radially from said central axis.

10. The apparatus of claim 1, wherein said pick-up further comprises:
    a first conformable outer surface; and,
    a second non-conformable inner surface disposed proximate to said first conformable outer surface;
    wherein said first conformable outer surface rotates said article after said article is transferred from said first surface to said first conformable outer surface of said pick-up.

11. The apparatus of claim 10, wherein said second non-conformable inner surface contacts said first outer surface, said first outer surface being conformable to said second inner surface.

12. The apparatus of claim 1, wherein said pick-up is a vacuum pick-up.

13. The apparatus of claim 1, wherein said pick-up comprises:
    (a) a conformable disk having a first side and a second side opposed thereto, said disk being rotatable about a longitudinal axis; and,
    (b) a non-conformable support surface contacting said second side of said conformable outer surface;
    wherein said first side of said conformable disk can engage an article having a first orientation;
    wherein after said article engages said first side, said conformable disk changes said first orientation of said article to a second orientation upon rotation of said disk about said longitudinal axis.

14. An apparatus for changing the spacing between discrete articles comprising:
    a plurality of linear motors orbitally disposed about a central axis, each of said linear motors having a first pick-up operatively associated therewith;
    wherein each of said plurality of linear motors is capable of adjusting the radial distance of said pickup operatively associated therewith from said central axis;
    wherein said first pick-up contacts an article; and,
    wherein said linear motor adjusts said radial distance of said first pickup from said central axis.

15. The apparatus of claim 14 wherein said article is displaced from said first pick-up onto a surface.

16. The apparatus of claim 14 further comprising a second pick-up, each of said plurality of linear motors being capable of adjusting the radial distance of said second pick-up disposed proximate thereto from said central axis.

17. The apparatus of claim 16 wherein said first and second pick-ups orbit about said central axis.

18. The apparatus of claim 14, wherein said first pick-up does not experience a circumferential drag as said first pick-up orbits about said central axis.

19. A method for changing the spacing between discrete articles, said method comprising the steps of:
    (a) providing a plurality of articles on a first surface;
    (b) contacting each of said articles with a pick-up, said pick-up being operably connected to a linear motor, said linear motor being disposed radially about a central axis;
    (c) adjusting the radial position of said pick-up with said linear motor with respect to said central axis; and,
    (d) transferring said article from said pick-up to a second surface.

20. The method of claim 19 further comprising the step of:
    (e) prior to step (d), rotating said pick-up about said central axis.

* * * * *